US012583527B2

(12) United States Patent
Lee et al.

(10) Patent No.: US 12,583,527 B2
(45) Date of Patent: Mar. 24, 2026

(54) VEHICLE BODY REAR STRUCTURE

(71) Applicants: Hyundai Motor Company, Seoul (KR); Kia Corporation, Seoul (KR)

(72) Inventors: HaeHoon Lee, Seoul (KR); Jungho Lee, Suwon-si (KR); ChangHak Kang, Hwaseong-si (KR); Chan Woong Jeon, Incheon (KR); Sang Kyoung Han, Gunpo-si (KR); Youngrock Kim, Gwangmyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 441 days.

(21) Appl. No.: 18/459,840

(22) Filed: Sep. 1, 2023

(65) Prior Publication Data

US 2024/0190509 A1     Jun. 13, 2024

(30) Foreign Application Priority Data

Dec. 13, 2022    (KR) ......................... 10-2022-0173933

(51) Int. Cl.
| | |
|---|---|
| *B62D 25/08* | (2006.01) |
| *B62D 25/02* | (2006.01) |
| *B62D 25/04* | (2006.01) |
| *B62D 25/06* | (2006.01) |
| *B62D 27/00* | (2006.01) |
| *B62D 27/02* | (2006.01) |

(52) U.S. Cl.
CPC ............. *B62D 25/08* (2013.01); *B62D 25/02* (2013.01); *B62D 25/04* (2013.01); *B62D 25/06* (2013.01); *B62D 27/00* (2013.01); *B62D 27/023* (2013.01)

(58) Field of Classification Search
CPC ........ B62D 25/04; B62D 25/06; B62D 25/08; B62D 25/02; B62D 27/023
USPC ... 296/193.4, 5, 6, 8, 203.01, 4, 29, 30, 210
See application file for complete search history.

(56) References Cited

U.S. PATENT DOCUMENTS

| | | | | |
|---|---|---|---|---|
| 6,729,682 B2 * | 5/2004 | Delavalle | ............... | B62D 25/08 296/193.08 |
| 7,347,475 B2 * | 3/2008 | Ikemoto | ............... | B62D 25/087 296/37.16 |
| 7,810,876 B2 * | 10/2010 | Hedderly | ............... | B62D 25/08 296/29 |
| 7,850,226 B2 * | 12/2010 | Hedderly | ............. | B62D 27/023 296/193.08 |
| 8,585,130 B2 * | 11/2013 | Gonin | .................. | B62D 21/152 296/187.11 |
| 8,801,084 B2 * | 8/2014 | Gonin | ...................... | B60J 5/101 296/187.11 |
| 8,919,869 B2 * | 12/2014 | Horiguchi | ............. | B62D 25/02 296/193.08 |

(Continued)

*Primary Examiner* — Dennis H Pedder
(74) *Attorney, Agent, or Firm* — Slater Matsil, LLP

(57) ABSTRACT

An embodiment rear structure of a vehicle body includes a rear quarter roof side member defining part of an upper closed structure above the vehicle body, defining part of a rear closed structure behind the vehicle body, and including a side connection portion and a rear pillar upper reinforcement defining part of the rear closed structure, connected with a rear part of the rear quarter roof side member and a part of an upper part of the rear quarter roof side member, and including an upper pillar connection portion provided thereon, wherein the upper pillar connection portion is connected to the side connection portion by a fastener.

20 Claims, 8 Drawing Sheets

(56) References Cited

U.S. PATENT DOCUMENTS

| | | | |
|---|---|---|---|
| 9,010,847 B2 * | 4/2015 | Katou ................ | B62D 25/2027 |
| | | | 296/193.08 |
| 9,499,206 B2 * | 11/2016 | Sugano .................. | B62D 25/04 |
| 11,413,943 B2 * | 8/2022 | Kang ...................... | B62D 25/04 |
| 12,240,547 B2 * | 3/2025 | Gim ...................... | B62D 27/023 |
| 2008/0169682 A1 * | 7/2008 | Hedderly ............. | B62D 29/008 |
| | | | 296/76 |

* cited by examiner

VEHICLE BODY REAR STRUCTURE

CROSS-REFERENCE TO RELATED APPLICATIONS

This application claims the benefit of Korean Patent Application No. 10-2022-0173933, filed on Dec. 13, 2022, which application is hereby incorporated herein by reference.

TECHNICAL FIELD

The present invention relates to a vehicle body rear structure.

BACKGROUND

The sunroof is a component that is mounted on the roof of a vehicle body to provide a sense of openness to vehicle occupants.

In particular, the so-called panoramic roof is a configuration that occupies a significant portion of the vehicle roof, and the more it is combined with various parts of the vehicle body, the more the effect of reinforcing stiffness is very large from the perspective of the entire vehicle.

In general, the joint structure of the pillars and the panoramic roof are connected by welding with the roof rail and the roof panel and bolting between the panoramic roofs. However, it is not directly connected between the roof and the quarter roof side reinforcing member supporting the load in the length direction of the vehicle, but indirectly, so optimization of the connection strength is required.

The above information disclosed in this background section is only for enhancement of understanding of the background of embodiments of the invention, and therefore it may contain information that does not form the prior art that is already known to a person of ordinary skill in the art.

SUMMARY

The present invention relates to a vehicle body rear structure. Particular embodiments relate to a vehicle body rear structure in which the connectivity of the rear upper part of the vehicle body is improved.

Embodiments of the present invention provide a vehicle body rear structure with improved connectivity of the rear upper portion of the vehicle body.

A vehicle body rear structure according to an exemplary embodiment of the present invention may include a rear quarter roof side member that forms a part of an upper closed structure above the vehicle body, forms a part of a rear closed structure behind the vehicle body, and includes a side connection portion, and a rear pillar upper reinforcement forming a part of the rear closed structure, connected with a rear part of the rear quarter roof side member and a part of the upper part of the rear quarter roof side member, and having an upper pillar connection portion formed thereon, wherein the side connection portion and the upper pillar connection portion may be connected by a fastener.

The rear quarter roof side member may include a quarter roof side reinforcement disposed on an upper portion of the vehicle body in a length direction of the vehicle body and having the side connection portion formed thereon.

The rear quarter roof side member may include a quarter roof side inner panel and a quarter roof side outer panel disposed outside the quarter roof side inner panel, wherein the quarter roof side reinforcement is connected between the quarter roof side inner panel and the quarter roof side outer panel.

The rear pillar upper reinforcement may include a rear pillar upper reinforcement outer flange that surrounds and is connected to a part of the rear surface of the quarter roof side inner panel and a part of the upper surface of the quarter roof side inner panel.

The quarter roof side reinforcement may include a roof side reinforcement connection flange connected with the rear pillar upper reinforcement outer flange.

The quarter roof side outer panel may include a side outer panel outer flange connected with the rear pillar upper reinforcement outer flange.

The quarter roof side outer panel may include a quarter roof side outer panel upper flange bent in an inward direction of the vehicle body, and the quarter roof side outer panel upper flange, the side connection portion, the upper pillar connection portion, and the quarter roof side inner panel upper surface may be integrally welded together.

The vehicle body rear structure according to an exemplary embodiment of the present invention may further include a rear end module surrounding the rear closed structure and connected to the rear of the vehicle body.

A rear end module connection portion may be formed to the rear end module, and the fastener may connect the side connection portion, the upper pillar connection portion, and the rear end module connection portion.

The vehicle body rear structure according to an exemplary embodiment of the present invention may further include a rear roof connected to an upper part of the vehicle body while surrounding a part of the rear quarter roof side member.

A roof engage part may be formed at the lower part of the rear roof, and the fastener may connect the side connection portion, the upper pillar connection portion, the rear end module connection portion, and the roof engage part.

The rear roof may include a roof end support attached to the rear quarter roof side member.

The rear roof may include a roof side support attached to the rear end module connection portion.

The rear quarter roof side member and the rear pillar upper reinforcement may be made of metal material, the rear end module may be made of plastic material, and the rear roof may be made of composite material.

According to the vehicle body rear structure according to an exemplary embodiment of the present invention, the connectivity of the rear upper portion of the vehicle body may be improved.

In addition, according to the vehicle body rear structure according to an exemplary embodiment of the present invention, the connectivity of the rear upper portion of the vehicle body may be improved even when parts of different materials are combined.

In addition, effects that can be obtained or predicted due to the embodiments of the present invention will be directly or implicitly disclosed in the detailed description of the embodiments of the present invention. That is, various effects expected according to an embodiment of the present invention will be disclosed within the detailed description to be described later.

BRIEF DESCRIPTION OF THE DRAWINGS

Since these drawings are for reference in explaining exemplary embodiments of the present invention, the technical idea of the present invention should not be construed as limited to the accompanying drawings.

DETAILED DESCRIPTION OF ILLUSTRATIVE EMBODIMENTS

Figure 1:
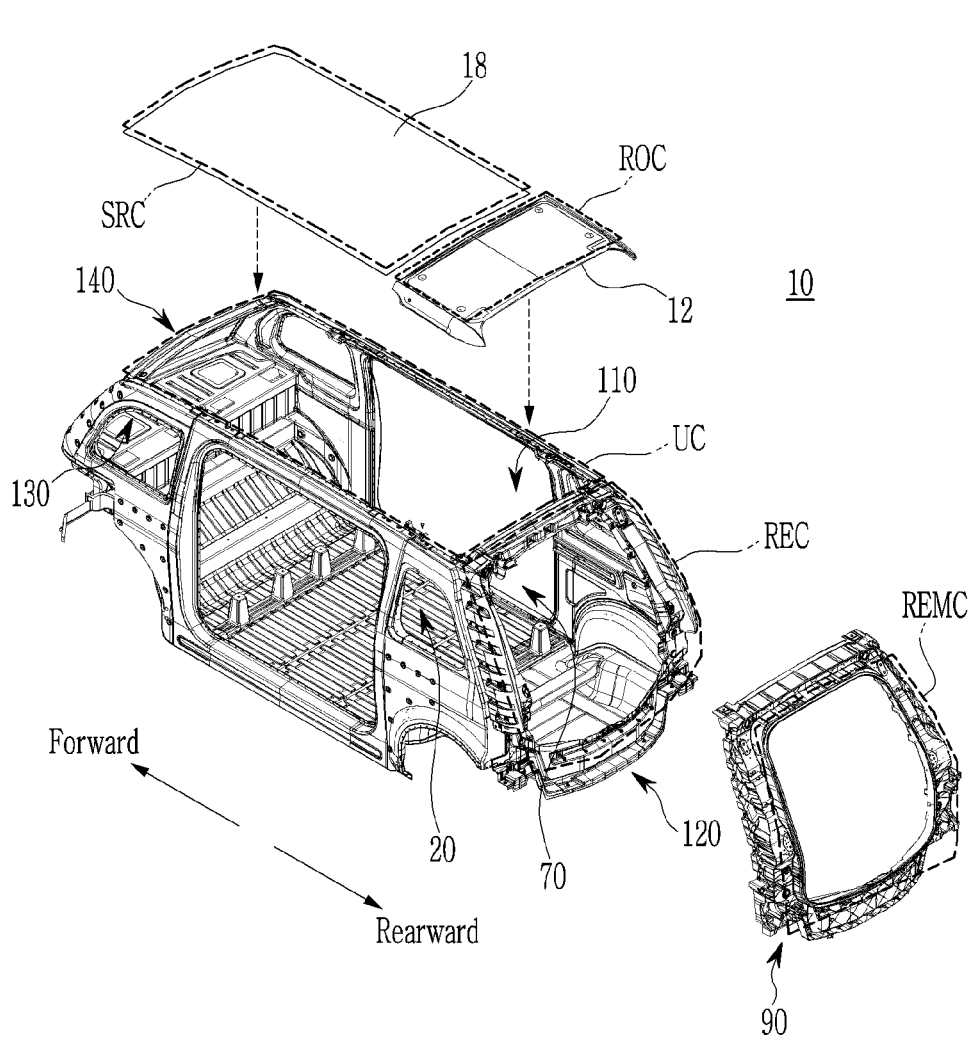
FIG. 1 is an exploded perspective view of a vehicle body rear structure according to an exemplary embodiment of the present invention.

Embodiments of the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In order to clearly describe embodiments of the present invention, parts irrelevant to the description are omitted, and the same reference numerals are assigned to the same or similar components throughout the specification.

Since the size and thickness of each component shown in the drawings are arbitrarily shown for convenience of description, embodiments of the present invention are not necessarily limited to those shown in the drawings, and the thickness is enlarged to clearly express various parts and regions.

Throughout the specification, when a part includes a certain component, this means that it may further include other components without excluding other components unless otherwise stated.

In addition, terms such as "unit" and "means" described in the specification mean a comprehensive unit of configuration that performs at least one function or operation.

When a part such as a layer, film, region, plate, etc. is said to be "on" another part, this includes not only the case of being directly on the other part, but also the case where there is another part in between.

In contrast, when an element is referred to as being "directly on" another element, there are no intervening elements present.

As used herein, "car", "vehicle", "vehicular", "automobile" or other similar terms refer to sport utility vehicles (SUVs), buses, trucks, passenger cars including various commercial vehicles, various types of ships, including boats or vessels of the same name, and also including hybrid vehicles, electric vehicles, plug-in hybrid electric vehicles, hydrogen-fueled vehicles, and other alternative fuel (e.g., fuels derived from sources other than petroleum) vehicles.

Exemplary embodiments of the present invention will hereinafter be described in detail with reference to the accompanying drawings.

FIG. 1 is an exploded perspective view of a vehicle body rear structure according to an exemplary embodiment of the present invention.

Referring to FIG. 1, a vehicle body 10 to which a vehicle body rear structure according to an exemplary embodiment of the present invention may be applied may include a sunroof 18 mounted thereon.

The sunroof 18 may be, for example, a panoramic roof 18 and the panoramic roof 18 may occupy a significant portion of an upper part of the vehicle body 10.

A rear roof 12 may be mounted at the rear of the sunroof 18.

In the detailed description and claims of this specification, the meaning of closed structure is a configuration in which the boundaries of the defined space are connected without disconnection.

An edge of the sunroof 18 may form a sunroof closed structure SRC, and an edge of the rear roof 12 may form a roof closed structure ROC.

An upper edge corresponding to the edge of the sunroof 18 and the rear roof 12 of the vehicle body 10 may form an upper closed structure UC.

The vehicle body 10 to which the vehicle body rear structure according to an exemplary embodiment of the present invention can be applied may include a front roof cross member 140 disposed on a front upper portion of the vehicle body 10, a front quarter roof side member 130 connected to the front roof cross member 140 and provided on both sides of the front of the vehicle body 10, respectively, a rear roof cross member 110 disposed on a rear upper portion of the vehicle body 10, and a rear quarter roof side member 20 connected to the rear roof cross member 110 and provided on both rear sides of the vehicle body 10, respectively.

The front roof cross member 140, the front quarter roof side member 130, the rear roof cross member 110, and the rear quarter roof side member 20 may form the upper closed structure UC.

The vehicle body 10 to which the vehicle body rear structure according to an exemplary embodiment of the present invention can be applied may further include a rear lower cross member 120 disposed at a rear lower portion of the vehicle body 10, and the rear roof cross member 110, the rear quarter roof side member 20, and the rear lower cross member 120 may form a rear closed structure REC behind the vehicle body 10.

The vehicle body 10 to which the vehicle body rear structure according to an exemplary embodiment of the present invention can be applied may further include a rear end module go forming a rear of the vehicle body 10 corresponding to the rear closed structure REC.

An edge of the rear end module 90 may form a rear end module closed structure REMC.

The roof closed structure ROC, the sunroof closed structure SRC, the upper closed structure UC, the rear closed structure REC, and the rear end module closed structure REMC overlap each adjacent closed structure to increase the strength of the vehicle body 10.

Figure 2:
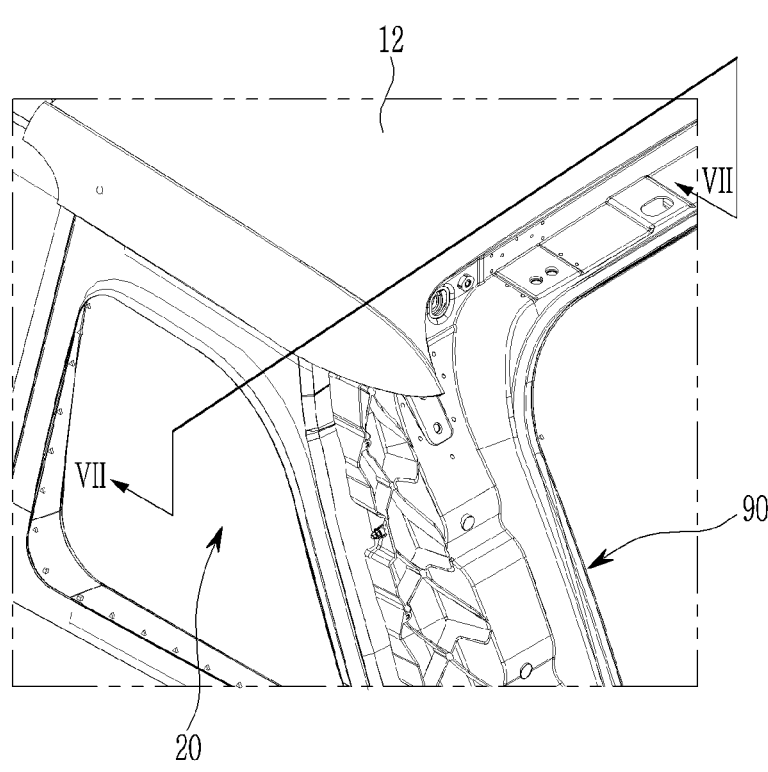
FIG. 2 is an enlarged view of a part of the vehicle body rear structure according to an exemplary embodiment of the present invention.

FIG. 2 is an enlarged view of a part of the vehicle body rear structure according to an exemplary embodiment of the present invention, and FIG. 3 to FIG. 6 are exploded perspective views of the vehicle body rear structure according to an exemplary embodiment of the present invention.

Figure 7:
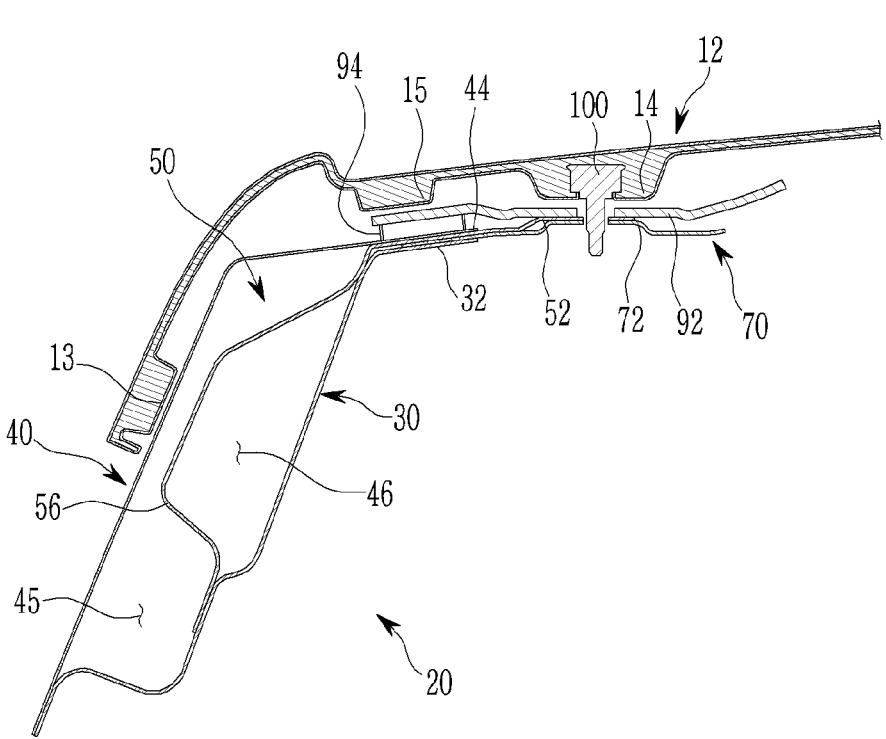
FIG. 7 is a cross-sectional view along line VII-VII of FIG. 2.

FIG. 7 is a cross-sectional view along line VII-VII of FIG. 2.

Referring to FIG. 1 to FIG. 7, the vehicle body rear structure according to an exemplary embodiment of the present invention includes the rear quarter roof side member 20 forming a part of the upper closed structure UC above the vehicle body 10, forming a part of the rear closed structure REC behind the vehicle body 10, and including a side connection portion 52, and a rear pillar upper reinforcement 70 that forms part of the rear closed structure REC is connected with the rear of the rear quarter roof side member 20 and a part of the upper portion of the rear quarter roof side member 20 and has an upper pillar connection portion 72.

The rear pillar upper reinforcement 70 may be connected to the rear of the rear quarter roof side member 20 to reinforce the strength of the rear side of the vehicle body 10.

The side connection portion 52 and the upper pillar connection portion 72 may be connected by a fastener 100.

That is, the rear quarter roof side member 20 and the rear pillar upper reinforcement 70 are directly connected through the fastener 100 to reinforce the connection between the upper closed structure UC and the rear closed structure REC.

The rear quarter roof side member 20 may include a quarter roof side reinforcement 50 disposed on an upper portion of the vehicle body 10 in a length direction of the vehicle body 10 and having the side connection portion 52 formed thereon.

The quarter roof side reinforcement 50 may reinforce the rigidity of the upper portion of the rear quarter roof side member 20.

The rear quarter roof side member 20 may further include a quarter roof side inner panel 30 and a quarter roof side outer panel 40 disposed outside the quarter roof side inner panel 30.

The quarter roof side reinforcement 50 may be connected between the quarter roof side inner panel 30 and the quarter roof side outer panel 40.

Figure 3:
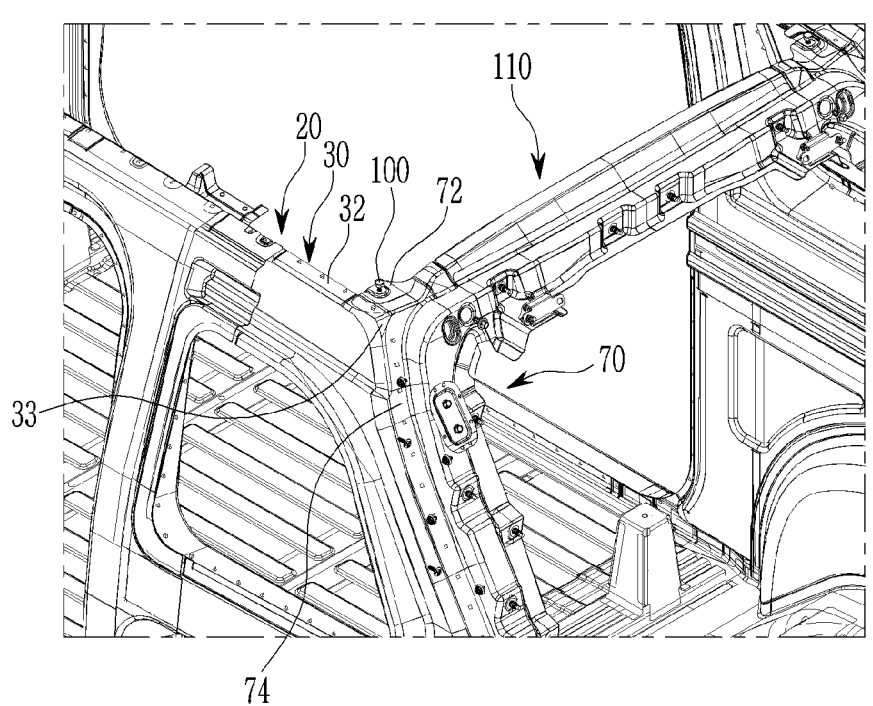
FIG. 3 to FIG. 6 are exploded perspective views of the vehicle body rear structure according to an exemplary embodiment of the present invention.

Referring to FIG. 3, the rear pillar upper reinforcement 70 may include a rear pillar upper reinforcement outer flange 74 that surrounds and is connected to a part of a rear surface 33 of the quarter roof side inner panel 30 and a part of an upper surface 32 of the quarter roof side inner panel 30.

For example, the rear pillar upper reinforcement 70 surrounds parts of the rear surface 33 and upper surface 32 of the quarter roof side inner panel 30 and is welded to increase the combined strength of the upper closed structure UC and the rear closed structure REC.

Figure 4:
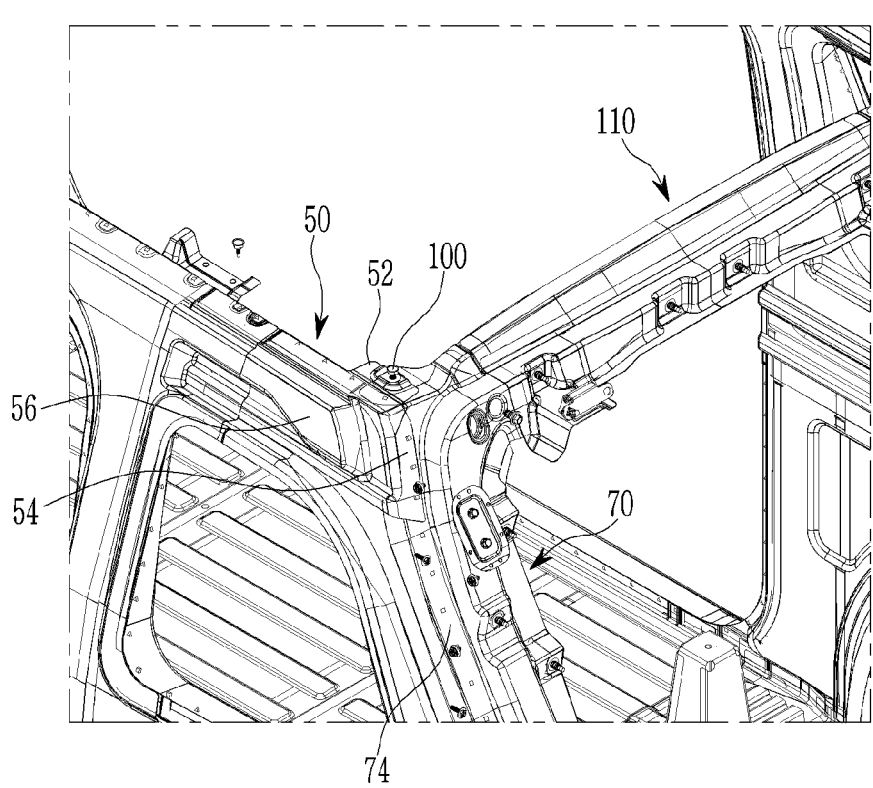

Referring to FIG. 4, the quarter roof side reinforcement 50 may include a roof side reinforcement connection flange 54 connected with the rear pillar upper reinforcement outer flange 74.

A part of the side connection portion 52 and the roof side reinforcement connection flange 54 of the quarter roof side reinforcement 50 surround the rear pillar upper reinforcement outer flange 74 and are welded together to increase the combined strength of the upper closed structure UC and the rear closed structure REC.

Figure 5:
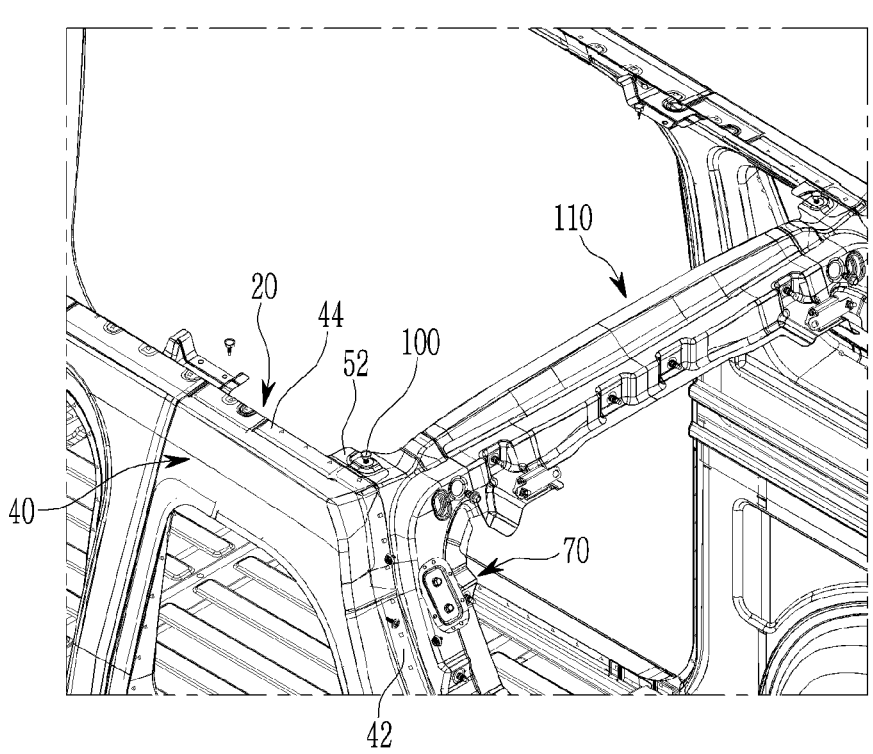

Referring to FIG. 5, the quarter roof side outer panel 40 may include a side outer panel outer flange 42 connected to the rear pillar upper reinforcement outer flange 74.

The quarter roof side outer panel 40 further includes a quarter roof side outer panel upper flange 44 bent in an inward direction of the vehicle body 10, and the quarter roof side outer panel upper flange 44, the side connection portion 52, the upper pillar connection portion 72, and the quarter roof side inner panel upper surface 32 may be integrally welded together.

That is, the rear pillar upper reinforcement outer flange 74 is overlapped and connected with a part of the rear surface 33 and the upper surface 32 of the quarter roof side inner panel 30, the roof side reinforcement connection flange 54 surrounds and is connected with the overlapped portion, and the side outer panel outer flange 42 and the quarter roof side outer panel upper flange 44 surround and are connected with the upper portion of the overlapped portion.

That is, each member is overlapped and connected to increase the bonding strength of the upper closed structure UC and the rear closed structure REC.

Figure 6:
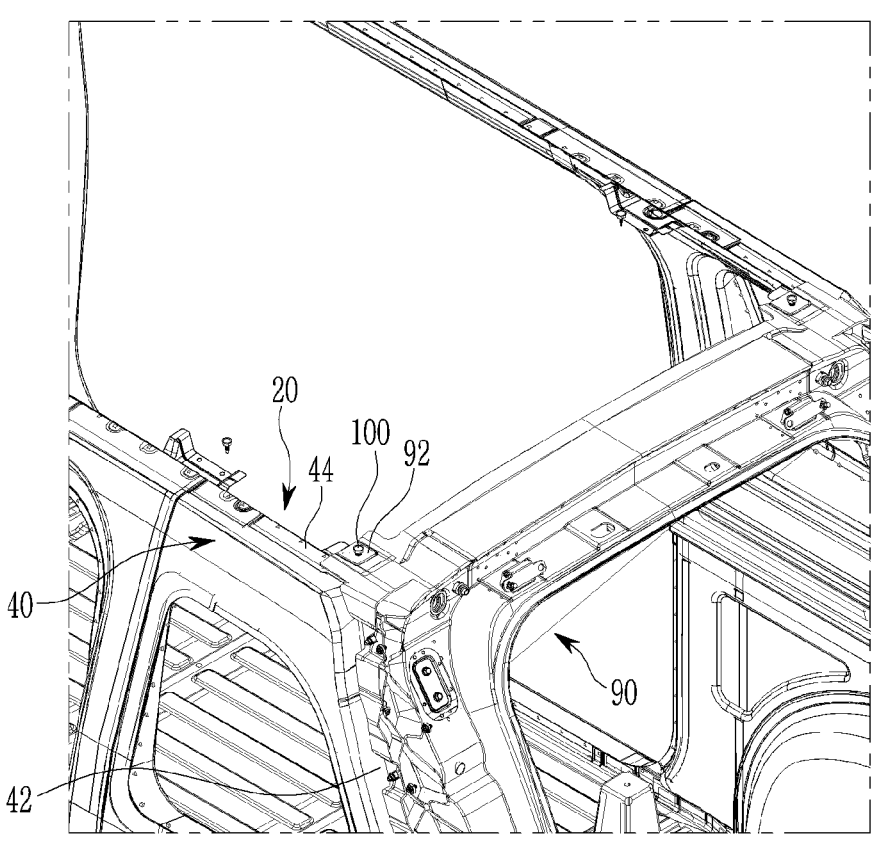

Referring to FIG. 6, the vehicle body rear structure according to an exemplary embodiment of the present invention may further include the rear end module 90 that surrounds the rear closed structure REC and is connected to the rear of the vehicle body 10.

The rear end module 90 may overlap and be connected with the parts where the quarter roof side inner panel 30, the rear pillar upper reinforcement 70, the quarter roof side reinforcement 50, and the quarter roof side outer panel 40 are overlapped and combined.

That is, the bonding strength of the upper closed structure UC, the rear closed structure REC, and the rear end module closed structure REMC may be increased.

Referring to FIG. 7, a rear end module connection portion 92 is formed to the rear end module 90, and the fastener 100 may connect the side connection portion 52, the upper pillar connection portion 72, and the rear end module connection portion 92.

The vehicle body rear structure according to an exemplary embodiment of the present invention may further include the rear roof 12 connected to the upper part of the vehicle body 10 while surrounding a part of the rear quarter roof side member 20.

A roof engage part 14 is formed below the rear roof 12, and the fastener 100 may engage the side connection portion 52, the upper pillar connection portion 72, the rear end module connection portion 92, and the roof engage part 14.

That is, the rear roof 12, the rear end module 90, the rear pillar upper reinforcement 70, and the rear quarter roof side member 20 are integrally connected.

Therefore, the coupling strength of the roof closed structure ROC, the upper closed structure UC, the rear closed structure REC, and the rear end module closed structure REMC may be increased.

The rear quarter roof side member 20 and the rear pillar upper reinforcement 70 may be formed of a metal material, the rear end module 90 may be formed of a plastic material, and the rear roof 12 may be formed of a composite material.

That is, the roof closed structure ROC, the upper closed structure UC, the rear closed structure REC, and the rear end module closed structure REMC may be integrally connected even if they are formed of different materials, so that the bonding force can be increased.

At the end of the rear end module 90, a rear end module support 94 protrudes so that the rear quarter roof side member 20 and the rear pillar upper reinforcement 70 overlap to support the welded portion.

The quarter roof side inner panel 30 and the quarter roof side outer panel 40 form a side closed space in the length direction of the vehicle body 10 therebetween, and the quarter roof side reinforcement 50 may include a side reinforcement bend portion 56 dividing the side closed space.

The side strength of the vehicle body 10 may be increased by forming double closed spaces 45 and 46 in the length direction of the vehicle body 10 inside the rear quarter roof side member 20.

Figure 8:
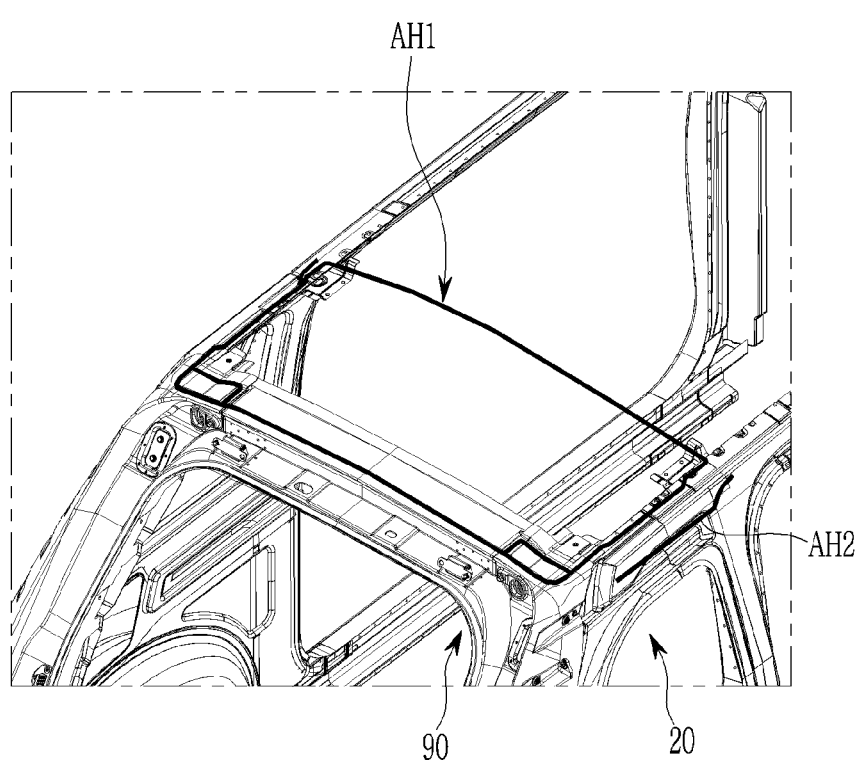
FIG. 8 is a drawing explaining the connection of the rear roof of the vehicle body rear structure according to an exemplary embodiment of the present invention.

FIG. 8 is a drawing explaining the connection of the rear roof of the vehicle body rear structure according to an exemplary embodiment of the present invention.

Referring to FIG. 7 and FIG. 8, the rear roof 12 may include a roof end support 13 attached to the rear quarter roof side member 20.

In addition, the rear roof 12 may include a roof side support 15 attached to the rear end module connection portion 92.

AH1 and AH2 shown in FIG. 8 represent adhesives applied between the vehicle body 10 and the rear roof 12, respectively. Through each adhesive AH1 and AH2, the roof side support 15 and the roof end support 13 are attached to the vehicle body 10.

As described above, according to the vehicle body rear structure according to an exemplary embodiment of the present invention, the strength of the vehicle body can be increased by reinforcing the connectivity of the rear upper portion of the vehicle body.

In addition, according to the vehicle body rear structure according to an exemplary embodiment of the present invention, the strength of the vehicle body can be increased by reinforcing the connectivity of the rear upper part of the vehicle body even in a vehicle equipped with a sunroof, particularly a panoramic sunroof.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A rear structure of a vehicle body, the rear structure comprising:
a rear quarter roof side member defining part of an upper closed structure above the vehicle body, defining part of a rear closed structure behind the vehicle body, and comprising a side connection portion; and
a rear pillar upper reinforcement defining part of the rear closed structure, connected with a rear part of the rear quarter roof side member and a part of an upper part of the rear quarter roof side member, and comprising an upper pillar connection portion provided thereon, wherein the upper pillar connection portion is connected to the side connection portion by a fastener.

2. The rear structure of claim 1, wherein the rear quarter roof side member comprises a quarter roof side reinforcement disposed on an upper portion of the vehicle body in a length direction of the vehicle body and having the side connection portion provided thereon.

3. The rear structure of claim 2, wherein the rear quarter roof side member comprises:
a quarter roof side inner panel; and
a quarter roof side outer panel disposed outside the quarter roof side inner panel, wherein the quarter roof side reinforcement is connected between the quarter roof side inner panel and the quarter roof side outer panel.

4. The rear structure of claim 3, wherein the rear pillar upper reinforcement comprises a rear pillar upper reinforcement outer flange that surrounds and is connected to a part of a rear surface of the quarter roof side inner panel and a part of an upper surface of the quarter roof side inner panel.

5. The rear structure of claim 4, wherein the quarter roof side reinforcement comprises a roof side reinforcement connection flange connected with the rear pillar upper reinforcement outer flange.

6. The rear structure of claim 5, wherein the quarter roof side outer panel comprises a side outer panel outer flange connected with the rear pillar upper reinforcement outer flange.

7. The rear structure of claim 6, wherein:
the quarter roof side outer panel comprises a quarter roof side outer panel upper flange bent in an inward direction of the vehicle body; and
the quarter roof side outer panel upper flange, the side connection portion, the upper pillar connection portion, and the upper surface of the quarter roof side inner panel are integrally welded together.

8. A rear structure of a vehicle body, the rear structure comprising:
a rear quarter roof side member defining part of an upper closed structure above the vehicle body, defining part of a rear closed structure behind the vehicle body, and comprising a side connection portion;
a rear pillar upper reinforcement defining part of the rear closed structure, connected with a rear part of the rear quarter roof side member and a part of an upper part of the rear quarter roof side member, and comprising an upper pillar connection portion provided thereon, wherein the upper pillar connection portion is connected to the side connection portion by a fastener; and
a rear end module surrounding the rear closed structure and connected to a rear of the vehicle body.

9. The rear structure of claim 8, wherein:
a rear end module connection portion is provided on the rear end module; and
the fastener connects the side connection portion, the upper pillar connection portion, and the rear end module connection portion.

10. The rear structure of claim 9, further comprising a rear roof connected to an upper part of the vehicle body while surrounding a part of the rear quarter roof side member.

11. The rear structure of claim 10, wherein:
a roof engage part is disposed at a lower part of the rear roof; and
the fastener connects the side connection portion, the upper pillar connection portion, the rear end module connection portion, and the roof engage part.

12. The rear structure of claim 10, wherein the rear roof comprises a roof end support attached to the rear quarter roof side member.

13. The rear structure of claim 10, wherein the rear roof comprises a roof side support attached to the rear end module connection portion.

14. The rear structure of claim 10, wherein the rear quarter roof side member and the rear pillar upper reinforcement comprise a metal material, the rear end module comprises a plastic material, and the rear roof comprises a composite material.

15. A vehicle comprising:
a vehicle body;
a front roof cross member disposed on a front upper portion of the vehicle body;
a pair of front quarter roof side members disposed on both sides of a front of the vehicle body, respectively, each of the front quarter roof side members being connected to the front roof cross member;
a rear roof cross member disposed on a rear upper portion of the vehicle body;
a pair of rear quarter roof side members disposed on both sides of a rear of the vehicle body, respectively, each of the rear quarter roof side members being connected to the rear roof cross member, and each of the rear quarter roof side members comprising a side connection portion, wherein the rear quarter roof side members define part of an upper closed structure above the vehicle body and define part of a rear closed structure behind the vehicle body; and a pair of rear pillar upper reinforcements, each of the rear pillar upper reinforcements defining part of the rear closed structure, being connected with a rear part of a respective one of the rear quarter roof side members and a part of an upper part of the respective one of the rear quarter roof side members, and comprising an upper pillar connection portion provided thereon, wherein the upper pillar connection portion is connected to the side connection portion by a fastener.

16. The vehicle of claim 15, wherein each of the rear quarter roof side members comprises a quarter roof side reinforcement disposed on an upper portion of the vehicle body in a length direction of the vehicle body and having the side connection portion provided thereon.

17. The vehicle of claim 16, wherein each of the rear quarter roof side members comprises:

a quarter roof side inner panel; and a quarter roof side outer panel disposed outside the quarter roof side inner panel, wherein the quarter roof side reinforcement is connected between the quarter roof side inner panel and the quarter roof side outer panel.

18. The vehicle of claim 17, wherein each of the rear pillar upper reinforcements comprises a rear pillar upper reinforcement outer flange that surrounds and is connected to a part of a rear surface of the quarter roof side inner panel and a part of an upper surface of the quarter roof side inner panel.

19. The vehicle of claim 18, wherein each of the quarter roof side reinforcements comprises a roof side reinforcement connection flange connected with the respective rear pillar upper reinforcement outer flange.

20. The vehicle of claim 19, wherein each of the quarter roof side outer panels comprises a side outer panel outer flange connected with the respective rear pillar upper reinforcement outer flange.

* * * * *